United States Patent [19]

Morgan et al.

[11] Patent Number: 5,414,634
[45] Date of Patent: May 9, 1995

[54] SYSTEM AND METHOD FOR CONTROLLING ITEM SELECTION, SEQUENCE AND COMPLETENESS

[75] Inventors: Bill W. Morgan, Dardanelle; James A. Whiteside; Julian R. Hann, both of Russellville, all of Ark.

[73] Assignee: Stark Manufacturing, Inc., Russellville, Ark.

[21] Appl. No.: 49,159

[22] Filed: Apr. 19, 1993

[51] Int. Cl.⁶ ............................................. G06F 15/46
[52] U.S. Cl. .................... 364/478; 364/468; 29/701; 414/273; 209/702
[58] Field of Search ................ 209/702–707, 209/546, 551, 549, 576, 3.2; 414/268, 269, 267, 273, 274, 289, 270; 364/478, 479, 468; 29/701–704, 709, 711, 712, 407

[56] References Cited

U.S. PATENT DOCUMENTS

| | | | |
|---|---|---|---|
| 2,796,658 | 6/1957 | Aller | 29/148.4 |
| 2,823,820 | 2/1958 | Merchant | 218/148.5 |
| 3,216,101 | 11/1965 | Miller | 29/407 |
| 3,222,597 | 12/1965 | Beatenbough et al. | 324/73 |
| 3,704,396 | 11/1972 | Macdonald | 317/124 |
| 3,908,800 | 9/1975 | Drapeau | 186/1 |
| 4,139,977 | 2/1979 | Russell | 53/77 |
| 4,181,948 | 1/1980 | Jackson et al. | 364/478 |
| 4,213,286 | 7/1980 | Ragard | 53/493 |
| 4,574,692 | 3/1986 | Wahli | 101/2 |
| 4,674,594 | 6/1987 | Jensen | 181/243 |
| 4,821,197 | 4/1989 | Kenik et al. | 364/468 |
| 4,850,783 | 7/1989 | Maekawa | 414/2685 |
| 4,998,206 | 3/1991 | Jones et al. | 364/468 |
| 5,029,095 | 7/1991 | Kenik et al. | 364/468 |
| 5,201,429 | 4/1993 | Hikosaka et al. | 211/59.2 |
| 5,238,349 | 8/1993 | Grace, Sr. | 414/269 |

Primary Examiner—Roy N. Envall, Jr.
Assistant Examiner—Brian C. Oakes
Attorney, Agent, or Firm—Senniger, Powers, Leavitt & Roedel

[57] ABSTRACT

A system and method for the repetitive selection of a group of items which utilizes a series of sensors associated mounted in a frame structure adjacent supplies of items so that the manual selection of an item or items from a supply can be monitored. A programable logic controller is utilized for allowing the system to be "taught" so that it can easily be used for the repetitive selection of many different desired groups of items without the necessity of rewiring or constructing a totally new device.

4 Claims, 3 Drawing Sheets 5,414,634

SYSTEM AND METHOD FOR CONTROLLING ITEM SELECTION, SEQUENCE AND COMPLETENESS

BACKGROUND OF THE INVENTION

The present invention relates to inventory control systems and, more particularly, to controlling the sequence and completeness of selection of items on a repetitive bases.

Particularly in the consumer goods market, but also in other areas of commerce, it is common for the manufacturer to be required to package and ship groups of parts for use in the subsequent assembly of an article. For example, large toys and bicycles are often sold partially assembled and are packaged with the appropriate number and kind of fasteners and parts to allow complete assembly by the purchaser. If, however, the wrong types or numbers of fasteners and smaller parts are supplied or missing, the purchaser is delayed in his or her assembly and must either return the purchased article or request that the additional parts be supplied. This incomplete or erroneous packaging thus causes loss of consumer satisfaction with his or her purchase and ultimately loss of confidence in the ability of the manufacturer to supply a complete package for assembly.

In the past, the difficulty for the manufacturer has been the human error in the manual repetitive selection of items to form the desired group of items. In such a selection process it is common to provide a plurality of bins or other containers each of which holds a plurality of one of the parts to be selected. These bins are usually adjacent one another so as to allow the worker to select the desired parts or items to form the desired group. However, no matter how careful the worker is, it is common to have an occasional error in the selection process and the number of errors depends on the skill and care of the individual worker. Therefore, it is usually necessary to constantly check the groups selected by the workers to ensure that the selection process is being carried out correctly and completely. The quality control process usually involves the random checking of selected groups of items to see if they are complete. However, even this checking results in some missed groups of improperly selected items which eventually get to the consumer.

In addition to random checking, it is known to provide a system for the repetitive selection of items where means are provided for sensing when each item of a desired group of items has been selected from a bin and whether the complete group of items has been selected in the proper sequence. This eliminates any error in the selection of items for the particular group of items intended to be selected. However, this system is "hard wired" and is designed for a specific selection sequence. Therefore, it is necessary to rewire or build a completely new system if the selection sequence is changed in any way. Thus, such a system is inconvenient to adapt to multiple uses and must be built for a specific group of items to be selected.

SUMMARY OF THE INVENTION

The present invention overcomes the difficulties and disadvantages associated with the prior art systems and methods by providing a system and method for the repetitive selection of a group of items which utilizes a series of sensors associated with supplies of items so that the manual selection of an item or items from a supply can be monitored, and provides means for allowing the system to be "taught" so that it can easily be used for the repetitive selection of many different desired groups of items without the necessity of rewiring or constructing a totally new device.

One aspect of the present invention is the provision of an apparatus for controlling item selection order and completeness, which includes a plurality of sensors for sensing access to a supply of each item, each sensor being disposed adjacent a supply of an item to be selected, and means connected to each sensor for receiving signals therefrom each time an item associated with the respective sensor is accessed and for recording the initial sequence in which the signals are received. The signal receiving means further compares subsequent signals from the sensors to the recorded sequence of initial signals and provides a signal to the user if the sequence is different. In addition, the apparatus of the present invention preferably includes a frame structure disposed adjacent supplies of items from which individual items will be selected to form desired groups, and supporting the plurality of sensors adjacent their respective supplies, each sensor being so disposed and arranged to sense a person reaching into its respective supply of an item for removal of an item from that supply. It may further include a plurality of bins, each containing a supply of an item, the frame being disposed adjacent the bins and supporting a sensor adjacent each bin. The apparatus may yet further include means for counting the number of accesses to the supplies of items.

A further aspect of the present invention is the provision of a method of controlling item selection order and completeness, including the steps of arranging the items to be selected in desired substantially adjacent locations where they are accessible, positioning a plurality of sensors adjacent respective item locations for sensing the selection of the respective item, and providing means connected to the sensors for receiving signals therefrom and for recording the sequence in which the signals are initially received from each sensor and thereafter determining if subsequent sets of signals from all of the sensors are received in the same sequence and providing a signal indicating when they are not. The method may include the step of supporting the sensors on a frame adjacent the locations of the items so that each sensor only senses selection of an item from the supply with which it is associated. The method may further include the step of providing means for counting the number of accesses to the supplies of items.

DETAILED DESCRIPTION OF THE PREFERRED EMBODIMENT

Figure 1:
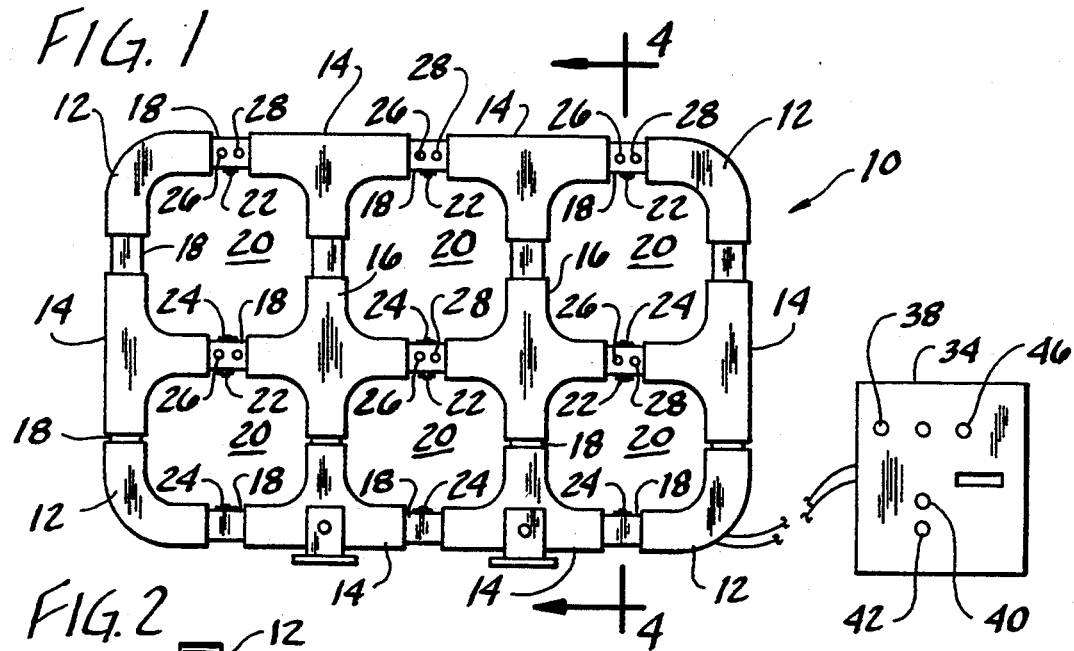
FIG. 1 is a front view of a preferred embodiment of the present invention.
Figure 2:
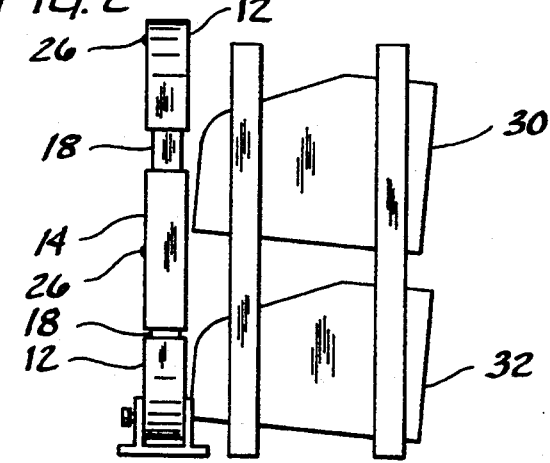
FIG. 2 is a side view of the embodiment of FIG. 1 disposed adjacent a stacked set of bins.
Figure 3:
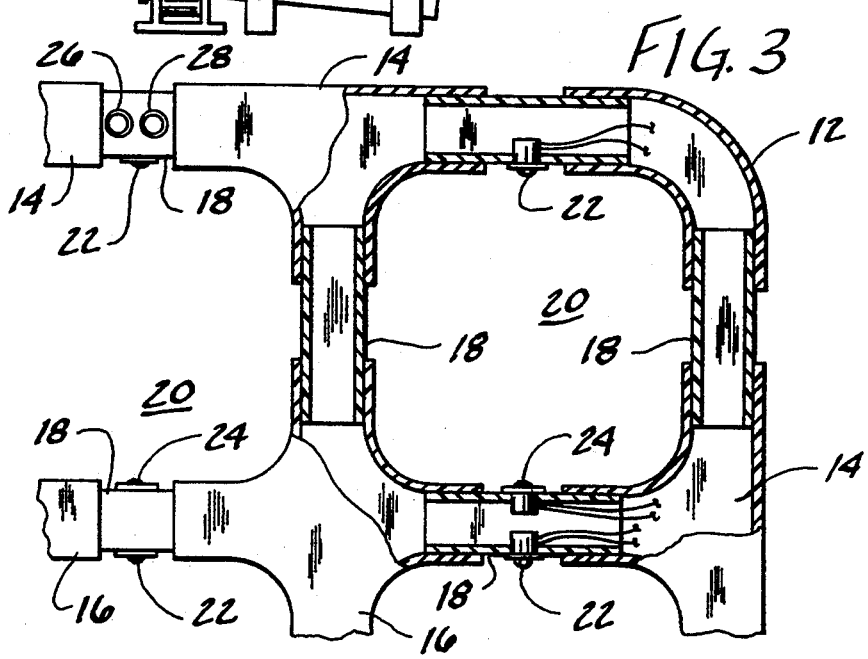
FIG. 3 is an expanded partial sectional view of a corner of the embodiment of FIG. 1 showing the sensors.
Figure 4:
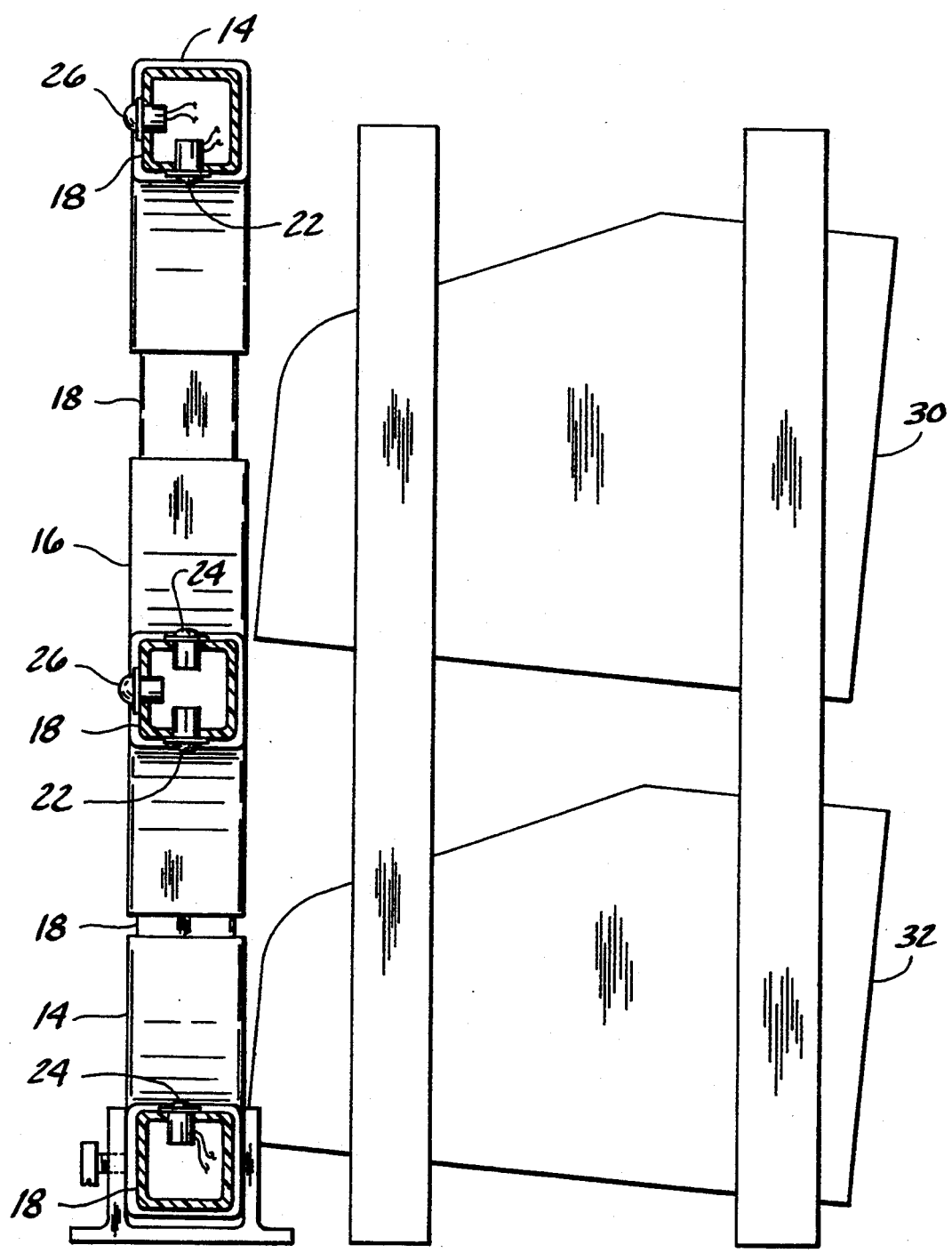
FIG. 4 is an enlarged sectional view along the line 4—4 of FIG. 1 showing the frame structure adjacent a set of supply bins.

In the preferred embodiment as shown in FIG. 1, the system of the present invention preferably includes a frame 10 constructed of a plurality of modular rectangular cross-section components including angular corner pieces 12, tee sections 14, cross pieces 16 and couplings 18. The various components are combined to form the frame 10 with a plurality of generally rectangular openings 20. The size, shape and number of these openings 20 can be varied to suit the needs for a particular installation. Although a unitary structure can be manufactured to provide such a frame work, this modular structure is more versatile and allows for its being easily modified and used for different applications if mechanical fasteners are used to assemble the pieces.

In the preferred embodiment the frame 10 is constructed as in FIG. 1 to provide the series of openings 20 of the required number, which in this example is six such openings. In each opening 20 there are mounted in the couplings 18 an infrared emitter 22 and receiver 24. They are mounted in such a location that a person's hand inserted into the opening 20 will interrupt the infrared light beam normally extending from the emitter 22 to the receiver 24, thus causing a signal to be sent to the control circuit discussed below. In the preferred embodiment the emitters 22 are mounted on the upper couplings 18 forming each opening and the receivers 24 are mounted on the bottom couplings 18 although this is not essential since the emitters 22 and receivers 24 can be mounted anywhere in relation to the openings 20 so long as the insertion of a person's hand into the opening 20 can be detected. Likewise, the use of infrared sensors is not essential since any sensor capable of sensing the insertion of a hand into the openings 20 would be acceptable so long as its sensitivity can be limited to the single opening with which it is associated.

Also mounted to the couplings 18 above each opening 20 are red and green indicator lights 26 and 28, respectively. These are positioned so as to provide the user with visual signals during use of the frame 10. They are also connected to the control circuitry as described below. In the preferred embodiment, a green indicator light 26 is turned on over an opening 20 which is intended to be the first opening in the pretaught sequence. The person reaches into that opening 20 and retrieves the part such as from a bin 30 or 32. As the sensor senses the insertion of the person's hand, the control circuitry turns on the red light 28 over the same opening 20 and then a second green light 26 is turned on above the next opening 20 which would be the second opening in the pretaught sequence. This process is then repeated until the entire pretaught sequence of bin access is completed. At that point, the circuit resets the lights to their initial position to show the operator which bin to begin the sequence over with. Should a person reach into an opening 20 out of the pretaught sequence or into an opening not in the sequence, an alarm is sounded and the sequence is stopped.

Alternatively, a single indicator light can be used in place of the red and green indicator lights 26 and 28. For example, a single light would be lit to indicate the opening from which the selection is to be made. After the part is removed from the opening 20 that indicator light goes out and the next one in the pretaught sequence is lit, and so forth until the sequence is complete and the indicator light is then lit over the first opening 20 in the sequence so that it can then be started over.

Figure 5:
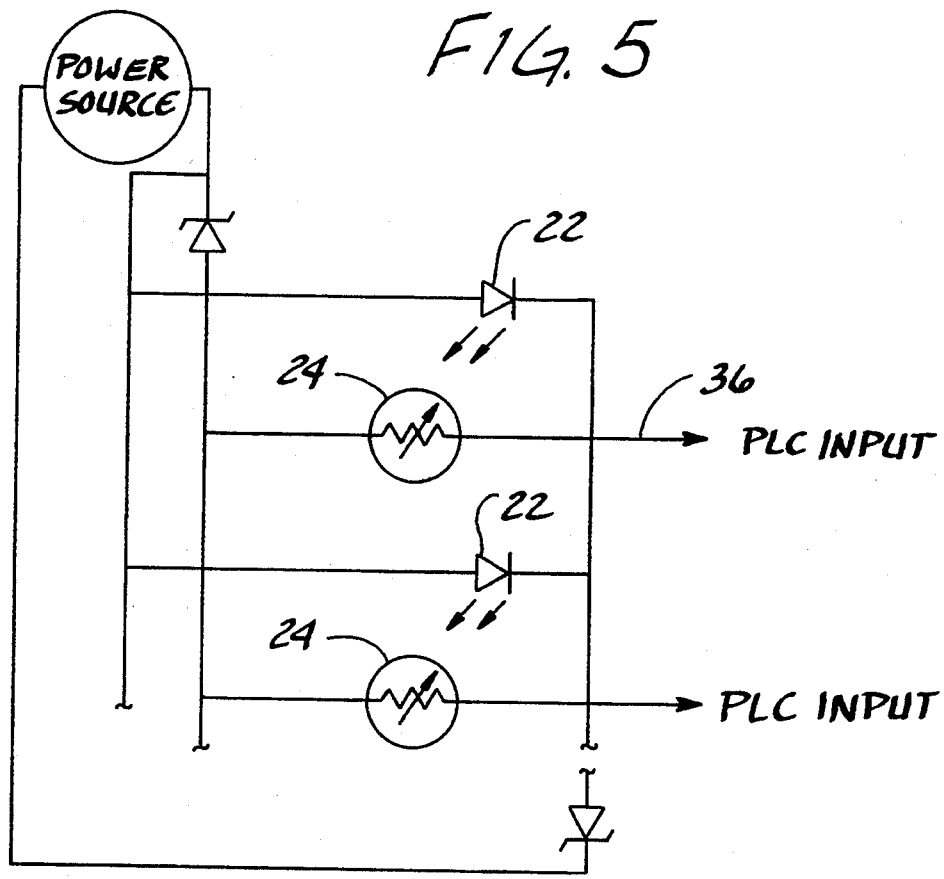
FIG. 5 is a partial schematic of the control circuit illustrating the sensor connections.

FIG. 5 illustrates the circuitry connecting the infrared emitters 22 and receivers 24 with the programmable logic controller (PLC) contained in the box 34 shown in FIG. 1. The illustration in FIG. 5 shows two pairs of emitter 22 and receiver 24, but the same arrangement is used for each of the emitter 22 and receiver 24 pairs in the preferred embodiment. In the preferred embodiment, the receiver 24 is photoelectric and has a transistor associated with it which, when the beam of light coming from the emitter 22 is broken, is biased so as to operate a relay in the receiver 22 which, in turn, is input to a line 36 connected to an input 37 on the PLC. Since each opening 20 has its own emitter 22 and receiver 24 pair and each is input into a different input terminal on the PLC, the sequence in which each beam is broken can be detected by the PLC.

The PLC used for this purpose in the preferred embodiment is a General Electric Sanuc model 920 or 930, but any PLC capable of performing the desired functions is an acceptable substitute.

Figure 6:
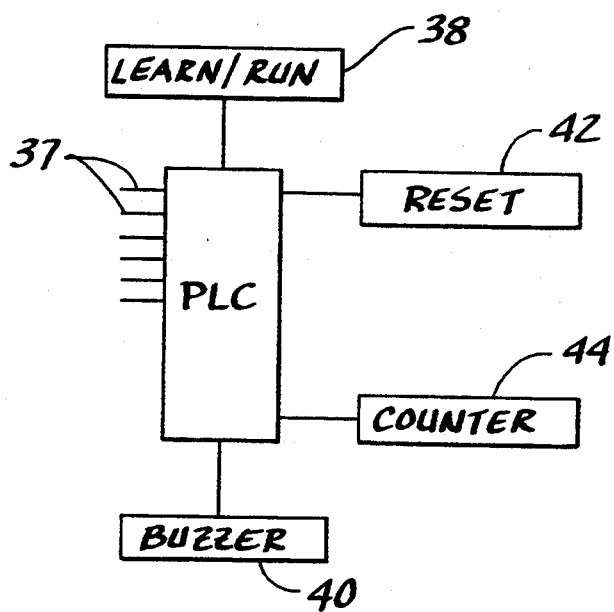
FIG. 6 is a block diagram of a portion of the control circuitry.

In order to place the PLC in the "teach" mode, the two-position rotary switch 38, shown in FIG. 1, on the control box 34, is set to the "learn" position, schematically illustrated in FIG. 6, which is connected to the PLC so as to cause the PLC to receive signals from the input lines 36 associated with each of the emitter 22 and receiver 24 pairs associated with each of the openings 20 in the frame 10. When the switch 38 is rotated to the "run" position, the memory of the PLC no longer accepts input from lines 36, but the input is compared to the previously stored input and the sequence of that input to determine if the proper sequence is being followed. If an error in the sequencing occurs, the PLC outputs a signal to the audible buzzer 40 which alerts the user that the sequence was violated. The user then pushes the reset button 42 which shuts off the buzzer 40 and cancels the PLC output to the buzzer 40 so that the PLC is in condition for receipt of a subsequent signal from any of the lines 36 for comparison in the proper sequence.

Since each interruption of the light beam from emitter 22 in each of the openings is kept track of by a counter 44 through an output from the PLC, when an error occurs, it is necessary to reset the electromechanical counter 44 by pushing a reset button 46 connected to the counter 44 which then decrements the counter by one for each push of the button 46.

If a new sequence of operation is desired to be established, the operator merely again turns the rotary switch 38 from the "run" position to the "learn" position and follows the appropriate sequence of insertion and removal of a hand in each of the appropriate openings 20 and then again positions the switch 38 to the "run" position where it will now compare the subsequent sequence to the newly established sequence. This can be done any number of times, thus making the system of the present invention very versatile for various uses in a manufacturing and assembly environment.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for controlling manual item selection order and completeness by a human operator, comprising:
- a frame structure forming a plurality of openings through which a hand can be inserted, each associated with a supply of an item;
- a plurality of lights supported by said frame structure adjacent respective openings where they are visible by the operator;
- a plurality of sensors supported by said frame for sensing access by the hand of the operator to each item, each sensor being disposed adjacent an item to be selected;
- programmable logic controller (PLC) means connected to each sensor for receiving and storing signals therefrom each time an item associated with the respective sensor is accessed by the hand of the operator and for recording an initial sequence in which the signals are received, said means thereafter activating said lights serially one at a time in the stored sequence so as to guide the operator in the selection sequence, said means further comparing subsequent signals from the sensors as the operator inserts his hand to the recorded sequence of initial signals and deactivating said lights in the sequence as an item is accessed by the operator, and providing a warning signal to the operator if the sequence is different; and
- switch means movable between a learning position permitting the PLC means to receive and store the signals each time an item is accessed, and a running position for permitting the PLC means to compare subsequent signals from the sensors to the recorded sequence.

2. Apparatus so defined in claim 1 wherein said switching means causes a new sequence of signals to be recorded in the PLC means in place of the initial sequence when switched from the run mode to the teach mode.

3. Apparatus as defined in claim 2, including:
- a plurality of bins, each containing a supply of an item, the frame being disposed adjacent the bins and supporting a sensor adjacent each bin.

4. Apparatus as defined in claim 1, including:
- an item selection counter that maintains a count of the items being selected; and
- a reset button which decrements the item selection counter if an improper access has been sensed by a sensor.

* * * * *